(12) United States Patent
Zhou et al.

(10) Patent No.: US 9,851,013 B2
(45) Date of Patent: Dec. 26, 2017

(54) VALVE TRIM ASSEMBLY AND FLOW CONTROL VALVE INCLUDING THE VALVE TRIM ASSEMBLY

(71) Applicant: EMERSON PROCESS MANAGEMENT (TIANJIN) VALVES CO. LTD, Tianjin (CN)

(72) Inventors: Qiyong Zhou, Tianjin (CN); Zhimin Sun, Tianjin (CN); Chun Gao, Tianjin (CN)

(73) Assignee: EMERSON PROCESS MANAGEMENT (TIANJIN) VALVES CO. LTD, Tianjin (CN)

( * ) Notice: Subject to any disclaimer, the term of this patent is extended or adjusted under 35 U.S.C. 154(b) by 71 days.

(21) Appl. No.: 13/731,419

(22) Filed: Dec. 31, 2012

(65) Prior Publication Data

US 2013/0193360 A1    Aug. 1, 2013

(30) Foreign Application Priority Data

Dec. 30, 2011   (CN) .......................... 201120576899

(51) Int. Cl.
| | |
|---|---|
| *F16K 47/08* | (2006.01) |
| *F16K 5/04* | (2006.01) |
| *F16K 47/04* | (2006.01) |

(52) U.S. Cl.
CPC ............... *F16K 5/04* (2013.01); *F16K 47/04* (2013.01); *F16K 47/08* (2013.01); *Y10T 137/86734* (2015.04); *Y10T 137/86759* (2015.04); *Y10T 137/86767* (2015.04); *Y10T 137/86775* (2015.04); *Y10T 137/86791* (2015.04); *Y10T 137/86799* (2015.04); *Y10T 137/86807* (2015.04)

(58) Field of Classification Search
CPC .......... F16K 74/08; F16K 47/04; F16K 47/08; Y10T 137/86734; Y10T 137/86767; Y10T 137/86759; Y10T 137/86775; Y10T 137/86791; Y10T 137/86799; Y10T 137/86807
USPC .............. 137/625.3, 625.33, 625.34, 625.35, 137/625.37, 625.38, 625.39
See application file for complete search history.

(56) References Cited

U.S. PATENT DOCUMENTS 3,183,933 A * 5/1965 Whitlock et al. ........ 137/624.18
4,125,129 A * 11/1978 Baumann ................... 137/625.3
(Continued)

*Primary Examiner* — Michael R Reid
*Assistant Examiner* — Christopher Ballman
(74) *Attorney, Agent, or Firm* — Marshall, Gerstein & Borun LLP

(57) ABSTRACT

A flow control valve includes an inlet, an outlet, and defines a fluid flow path. A valve seat is disposed within a valve body, and a valve plug in the valve body is surrounded by a cage. An exterior surface of the valve plug includes a plurality of notch sets, each notch set spaced apart from an adjacent notch set along the longitudinal axis, and the cage is disposed within the valve body and arranged to retain the valve seat, with an interior of the cage including a plurality of annular recesses. The annular recesses are spaced apart along the longitudinal axis, and the cage includes a plurality of apertures forming a portion of the fluid flow path. The notch sets and the recesses are arranged to form a plurality of turns in the fluid flow path when the valve plug is shifted toward the open position.

20 Claims, 7 Drawing Sheets

(56) References Cited

U.S. PATENT DOCUMENTS

| | | | | |
|---|---|---|---|---|
| 4,504,040 | A | * | 3/1985 | Spils .................. F16K 47/04 |
| | | | | 251/121 |
| 4,549,718 | A | * | 10/1985 | Seger ........................ 251/121 |
| RE33,053 | E | * | 9/1989 | Seger ........................ 251/121 |
| 5,113,908 | A | * | 5/1992 | Steinke .................. 137/625.3 |
| 5,615,708 | A | * | 4/1997 | Barron .................. 137/625.3 |
| 6,076,552 | A | * | 6/2000 | Takahashi .......... F15B 13/0402 |
| | | | | 137/625.3 |
| 7,726,339 | B2 | * | 6/2010 | Caprera ................ 137/625.33 |
| 7,959,127 | B2 | * | 6/2011 | Newton .................. F16K 1/12 |
| | | | | 137/625.37 |
| 2004/0238050 | A1 | * | 12/2004 | Hamblin et al. ......... 137/625.37 |
| 2009/0179169 | A1 | * | 7/2009 | Fleming .................... 251/186 |
| 2010/0252768 | A1 | * | 10/2010 | Caprera ................ F16K 47/04 |
| | | | | 251/309 |
| 2010/0300565 | A1 | * | 12/2010 | Samy .................... 137/601.01 |

\* cited by examiner

VALVE TRIM ASSEMBLY AND FLOW CONTROL VALVE INCLUDING THE VALVE TRIM ASSEMBLY

TECHNICAL FIELD

The present invention relates generally to flow control valves and to valve trim assemblies for such valves.

BACKGROUND

In a variety of fluid control systems, the flow of fluid through the system is controlled by flow control valves. In facilities that produce, distribute, or otherwise handle oil, natural gas, chemical products, or other fluids and/or gases, flow control valves are used to direct and regulate the flow of such process fluids in or through pipes, wells, pumps, vessels, refineries, or other equipment. Known flow control valves generally are shiftable between an open position that permits the flow of fluid, and a closed position that completely shuts-off the fluid flow. Other flow control valves are intended to regulate (e.g., throttle) the pressure and flow rate of the fluid flowing through the valve.

Due to high flow rates and high pressures in some systems, fluids passing through a valve or the control valve trim may experience cavitation or flashing, in which the flow dynamics cause the pressure to drop abruptly, thus creating bubbles. Cavitation or flashing may generate an excessive amount of noise, and also may cause erosion and excessive wear on the surrounding components due to the abrasive nature of the fluid flow. The occurrence of cavitation or flashing, and the accompanying noise and/or vibration, can eventually reduce the performance of the valve and may even lead to failure of the valve.

In certain applications, a flow control valve may experience the phenomenon of out-gassing as the valve is opening. Out-gassing is the process by which gases dissolved in a fluid come out of solution due to a change in pressure. One way to illustrate this concept is to consider a container of carbonated beverage under pressure. At first glance, the beverage appears to be a homogeneous liquid. However, if the container is shaken and then opened, the dissolved $CO2$ comes out of solution and will spray out of the container.

In process control systems, due to the initial high pressure present on the inlet side of the closed valve, the fluid may experience a very high pressure drop as it passes the control element or valve plug upon opening the valve. This initial pressure drop across the valve may be high enough to allow any gas contained in the fluid to separate out.

As is known, out-gassing can damage a valve in a variety of ways. For example, the high velocity jets coming out of solution carry small liquid particles. These liquid particles can impinge on internal surfaces at very high velocities, thus causing erosion damage. The high velocity jets also can impinge on the surrounding valve wall or other components to create vibration, which also can damage the valve. Finally, when the gas separates out of the fluid, the volume and speed of the fluid increases, creating both noise and vibration.

SUMMARY

In accordance with a first exemplary aspect, a flow control valve includes an inlet, an outlet, and defines a fluid flow path. A valve seat is disposed within a valve body, and a valve plug in the valve body is surrounded by a cage. An exterior surface of the valve plug includes a plurality of notch sets, each notch set spaced apart from an adjacent notch set along the longitudinal axis, and the cage is disposed within the valve body and arranged to retain the valve seat, with an interior of the cage including a plurality of annular recesses. The annular recesses are spaced apart along the longitudinal axis, and the cage includes a plurality of apertures forming a portion of the fluid flow path. The notch sets and the recesses are arranged to form a plurality of turns in the fluid flow path when the valve plug is shifted toward the open position.

In accordance with a second exemplary aspect, a valve trim assembly for a flow control valve includes a valve seat arranged for placement in a flow path of a valve body between an inlet and an outlet, a valve plug disposed in the valve body and surrounded by a cage, with the valve plug defining a longitudinal axis and arranged to shift along the longitudinal axis between an open position and a closed position, and with an exterior surface of the valve plug having a plurality of notch sets, each notch set spaced apart from an adjacent notch set along the longitudinal axis. The cage is disposed within the valve body and is arranged to retain the valve seat, with an interior of the cage including a plurality of annular recesses, the annular recesses spaced apart along the longitudinal axis, the cage including a plurality of apertures forming a portion of the fluid flow path. The notch sets and the recesses are arranged to form a plurality of turns in the fluid flow path when the valve plug is shifted toward the open position.

In accordance with or more preferred forms, the foregoing exemplary aspects may be combined with any one or more of the following preferred forms.

In one preferred form, the plurality of annular recesses includes a first annular recess defining a first volume and a second annular recess defining a second volume, the second volume greater than the first volume, with the first annular recess disposed adjacent the valve seat and the second annular recess spaced away from the valve seat.

In another preferred form, the plurality of notch sets includes a first notch set defining a first bevel angle and a second notch set defining a second bevel angle, the second bevel angle greater than the first bevel angle.

In another preferred form, the plug includes a protrusion between adjacent notch sets, and the protrusion is sized and arranged to engage an inwardly facing surface of the cage over a portion of an overall stroke length of the plug to provide a fluid flow dead band.

In another preferred form, the first notch set is rotated about the longitudinal axis of the plug relative to the second notch set.

The Figures and detailed description that follow below more particularly exemplify illustrative embodiments.

BRIEF DESCRIPTION OF THE DRAWINGS

Embodiments of the disclosure are better understood with reference to the following drawings.

Throughout the above drawings, like reference numerals will be understood to refer to like, similar or corresponding features or functions.

DETAILED DESCRIPTION

In the following detailed description of the preferred embodiments, reference is made to the accompanying drawings. The accompanying drawings illustrate one or more specific embodiments for practicing the teachings of the invention. The illustrated embodiments are not intended to be exhaustive of all possible embodiments. Instead, those of skill in the art will understand that other possible embodiments may be utilized, and that structural or logical changes may be made without departing from the scope of the disclosure.

Figure 1:
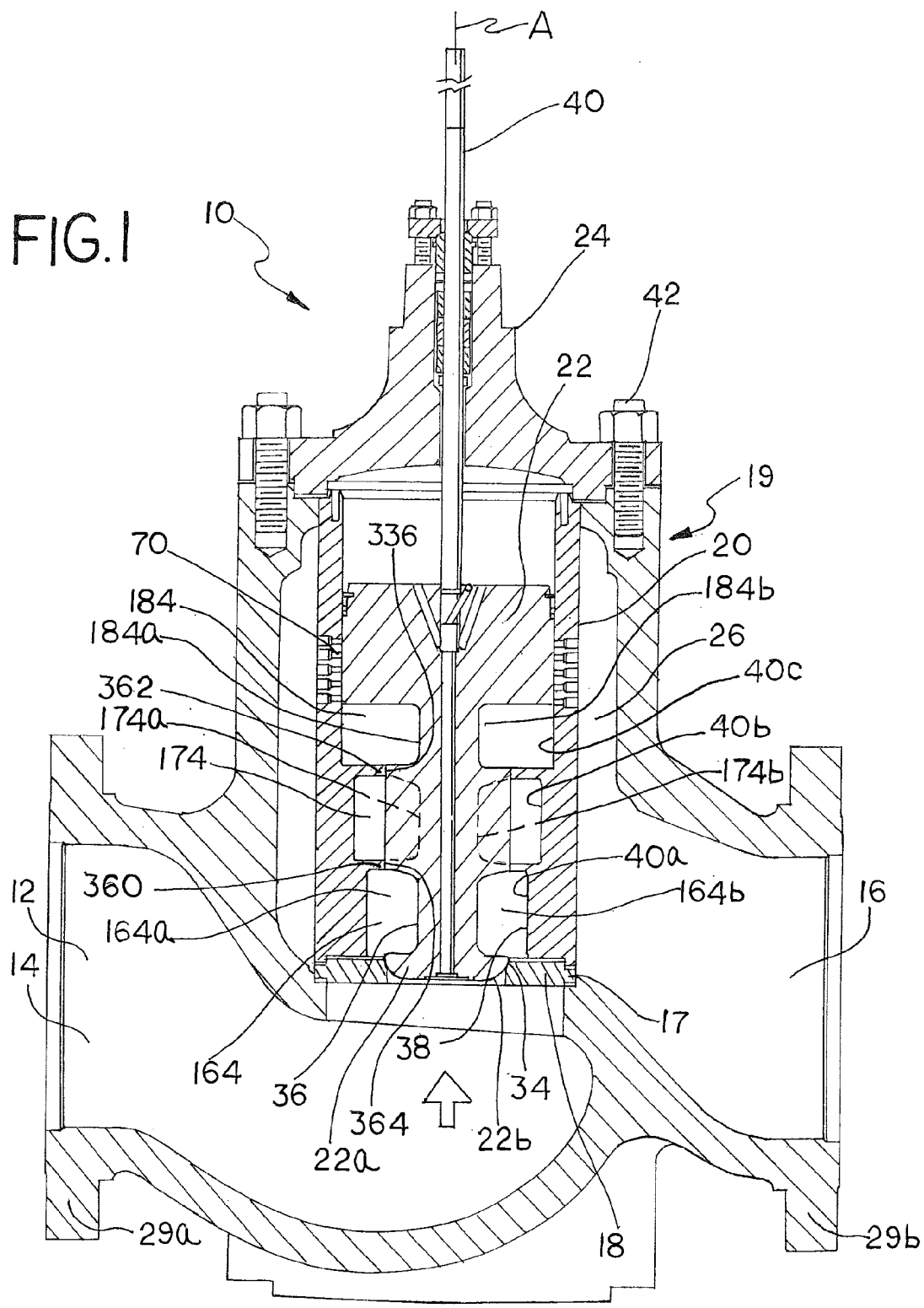
FIG. 1 is a cross-sectional view of a flow control valve assembled in accordance with the teachings of a disclosed embodiment of the invention and showing the valve in a closed position.

Referring to FIG. 1, a fluid flow control valve assembled in accordance with the present teachings is designated by reference numeral 10 and includes a valve body 12 having a central bore 26, an inlet port 14, an outlet port 16, and a valve trim assembly 19. The valve trim assembly 19 includes a valve seat 18, a cage 20 and a valve plug 22. The inlet port 14 communicates with the outlet port 16 through the valve trim assembly 19 along a fluid flow path 32. More specifically, the fluid flow path 32 is routed from the inlet port 14, through the valve seat 18 (when the valve plug 22 is moved away from the seat 18 to open the valve), through the cage 20 and into space defined by the bore 26 surrounding the cage 20, and finally to the outlet port 16. The valve seat 18 is positioned within a recess 17 provided within the valve body 12 and defines an opening 23 (more clearly illustrated in FIG. 2) disposed in the flow path 32 between the inlet port 14 and the outlet port 16. In the disclosed example, the valve seat 18 is secured within the recess 17 by the cage 20, and in turn both the valve seat 18 and the cage 20 are secured in place and against upward movement by the bonnet assembly 24. The valve body 12 preferably includes suitable end coupling flanges 29a and 29b so that other the flow control valve 10 can be suitably coupled to piping or other apparatus in a fluid system.

The valve plug 22 includes a lower end 22a having a beveled surface 22b adapted to fit in sealing relation against a corresponding sealing surface 34 of the valve seat 18. A lower end of the valve stem 40 is suitably secured to the valve plug 22, and the stem 40 passes through the bonnet assembly 24 so that an upper end of the valve stem 40 can be attached to a conventional valve actuator (not shown). Consequently, the valve stem 40 and the valve plug 22 are movable along a linear path defined by a longitudinal axis A.

The bonnet assembly 24 is fastened to the valve body 12 using threaded studs 42 or any other suitable fasteners and, as outlined above, thereby secures the cage 20 and the valve seat 18 in place within the valve body 12.

Figure 2:
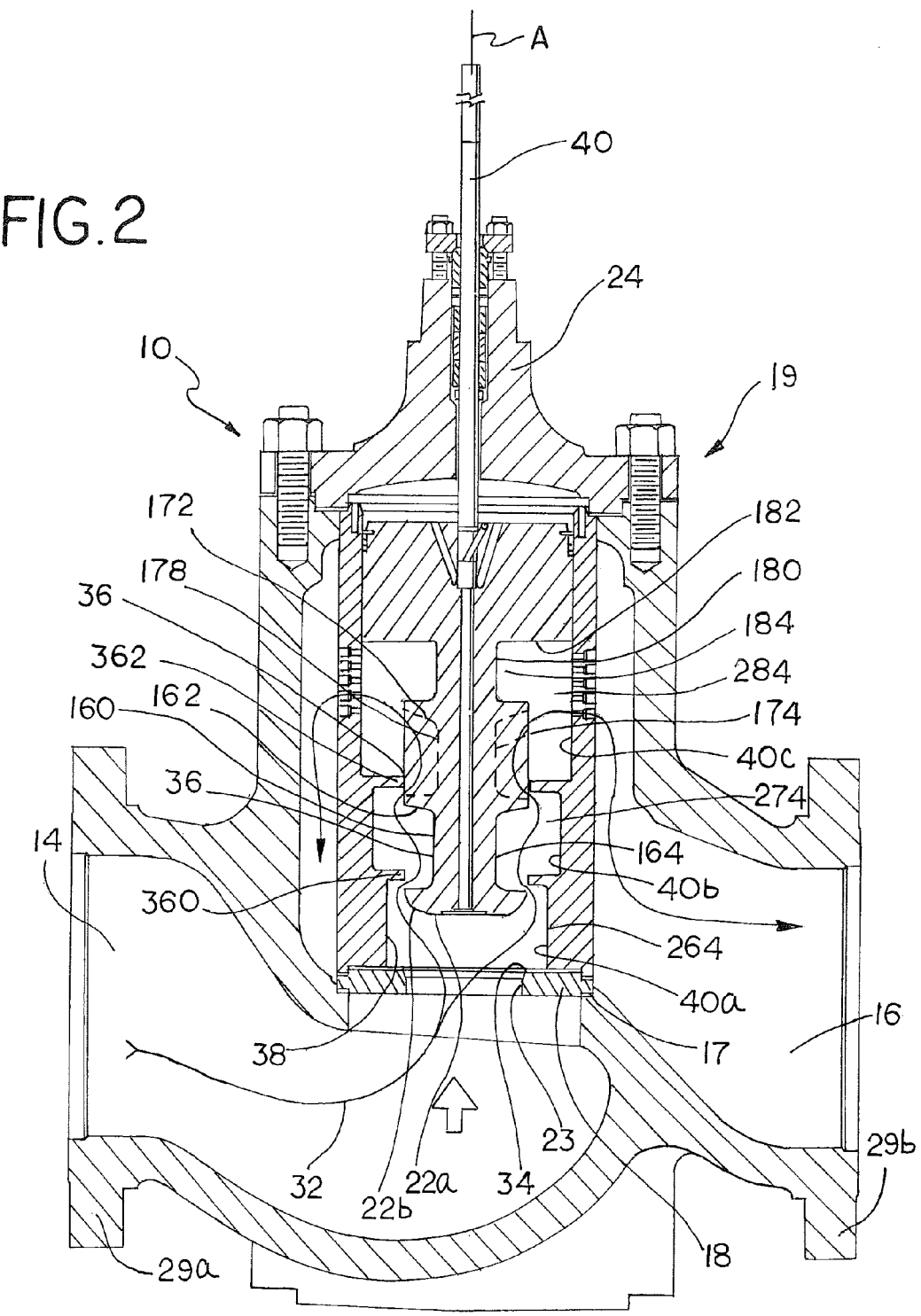
FIG. 2 is a cross-sectional view of the flow control valve of FIG. 1 but illustrating the valve in an open position and also showing the fluid flow path experiencing a number of turns.

As shown in FIG. 1 and FIG. 2, the valve plug 22 and the cage 20 are disposed coaxially along or relative to the longitudinal axis A of the valve stem 40. The valve plug 22 includes an exterior surface 36, and the cage 20 includes an interior surface 38. In the embodiment shown in FIGS. 1 and 2, the fluid flow path 32 includes a region between the exterior surface 36 of the plug 22 and the interior surface 38 of the cage 20. Consequently, the fluid flow path 32 includes 3 stages: stage 1, stage 2 and stage 3. Each of the three stages are defined by a notch set 164, 174 and 184, formed on the valve plug 22, and by corresponding annular recesses 264, 274, and 284, formed on the interior surface 38 of the cage 20, all as shown in FIGS. 1 and 2. The three (3) stages are arranged in series (i.e., along the flow path 32 with the stage 1 being upstream of stage 2, and stage 2 being upstream of stage 3). Consequently, fluid flowing along the flow path 32 and through the aperture 23 of the valve seat 18 passes through each of the three stages, and then exits suitable apertures 70 through the cage 20. The apertures 70 may be holes, slots, shaped holes, or any other suitable apertures.

Figure 3:
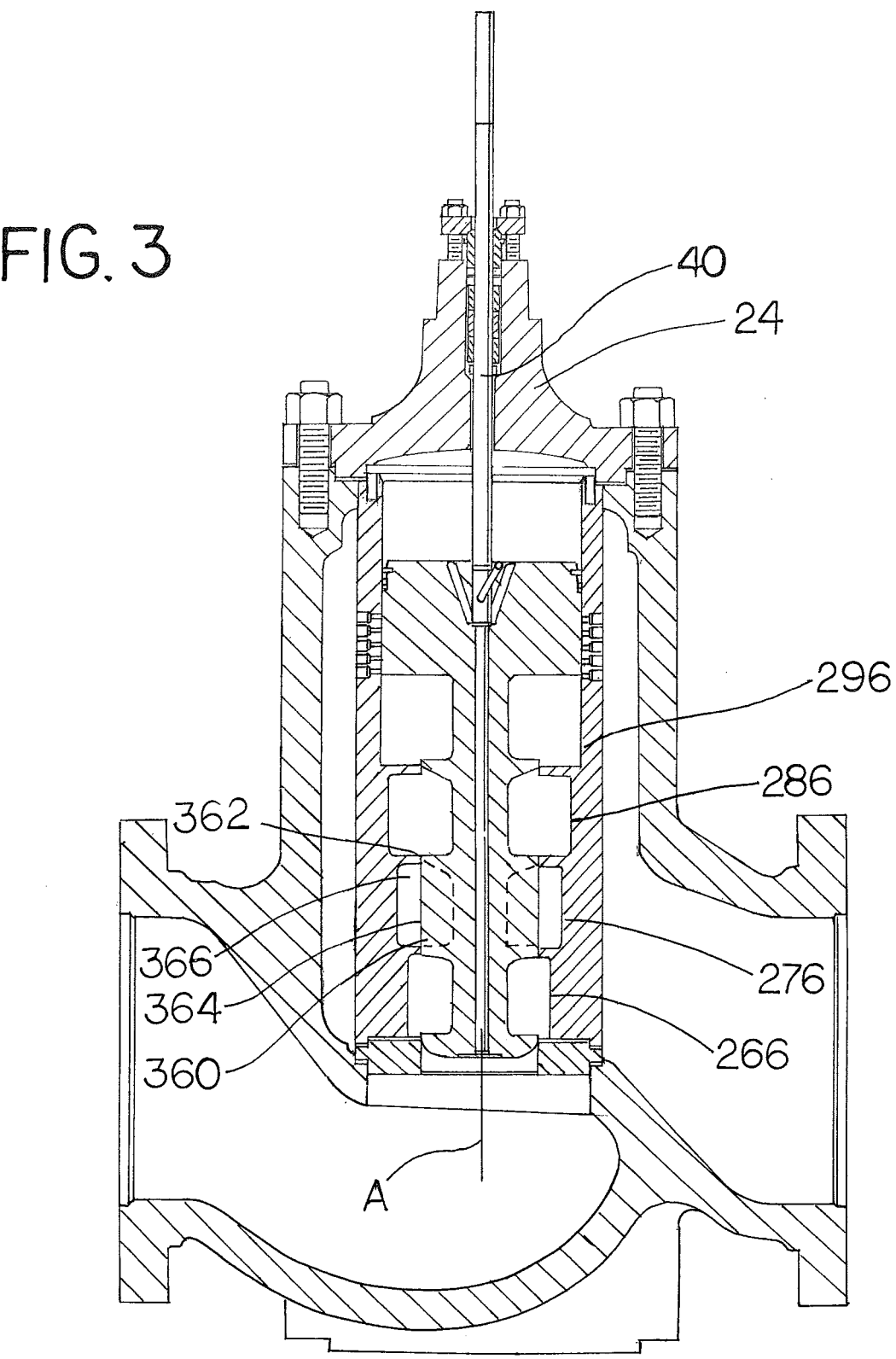
FIG. 3 is a cross-sectional view of a flow control valve assembled in accordance with the teachings of another disclosed embodiment of the invention and showing the valve in the closed position.
Figure 6:
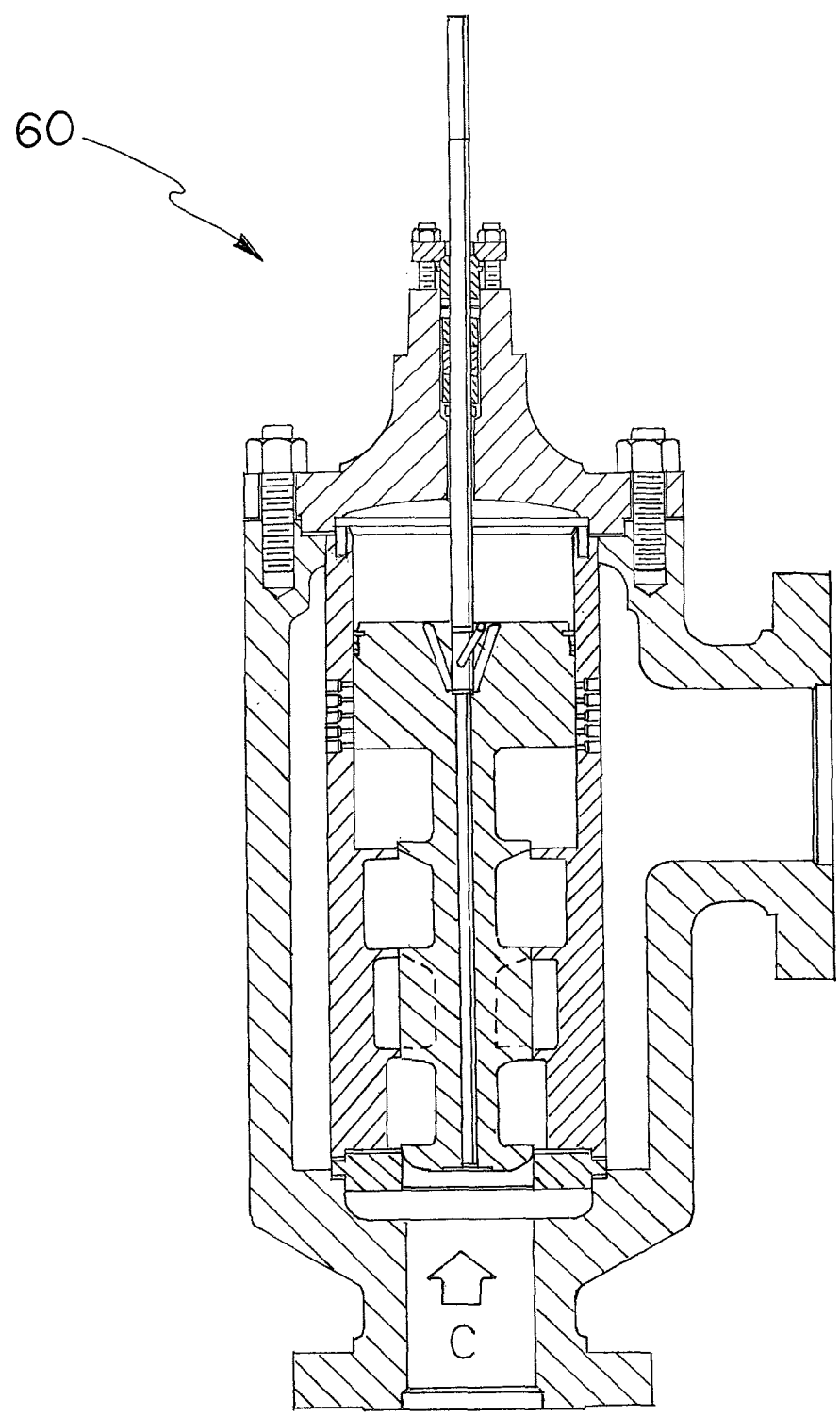
FIG. 6 is a cross-sectional view of a flow control valve assembled in accordance with the teachings of still another disclosed embodiment of the invention and showing the valve in the closed position.

As stated above, in the embodiment of FIGS. 1 and 2, the internal surface 38 of the cage 20 includes three annular recesses 264, 274 and 284. In the embodiment of FIGS. 3 and 6, the cage 20 includes four (4) notch sets and four (4) annular recesses 266, 276, 286 and 296. In the embodiment of FIG. 6, the inlet of the control valve is oriented in a different fashion.

In the embodiment of FIGS. 1 and 2, the annular recesses 264, 274 and 284 each include an internal surface 40a, 40b and 40c, respectively, with the internal surfaces 40a, 40b and 40c being approximately parallel to the longitudinal axis A of the valve stem. The surfaces 40a-c thus serve to define the outer extent of the internal radii of the annular recesses 264, 274 and 284, respectively. As illustrated, the radius of each annular recess may be equal to or greater than the radius of the preceding (e.g., upstream) annular recess. Consequently, the volume of each recess increases as fluid proceeds along the flow path 32 and through the stages 1-3.

More specifically, as shown in FIG. 1 and FIG. 2, the radius of each annular recess is larger than the preceding annular recess. To be specific, the radius of the second annular recess 274 (and hence the volume of the recess 274) is larger than the radius (and hence the volume) of the first annular recess 264. Similarly, the radius of the third annular recess 284 (and hence the volume of the third annular recess 284) is larger than the radius and volume of the second annular recess 274.

In the disclosed example of FIGS. 1 and 2, the notch sets 164, 174 and 184 are each formed by a pair of notches. The annular recess 264 of the first stage and the notch set 164 define an expanding space of the first stage, the annular recess 274 of the second stage and the notch set 174 define an expanding space of the second stage, and the annular recess 284 of the third stage and the notch set 184 define an expanding space of the third stage. As outlined above, the volume increases volume as the fluid proceeds through the first, second and third stages. Thus, the fluid expands as it reaches the first stage, expands into an even larger space as it reaches the second stage, and expands to a still larger space as it reaches the third stage. With the expanding space of each subsequent stage being larger than the expanding space of the preceding stage, the subsequent stage has enough room for the fluid and gas that separates from the fluid. In accordance with the disclosed examples, such design helps control the pressure drop between stages.

Further, as shown in FIG. 3 (but also applicable to FIGS. 1, 2 and 6), the cage 20 includes two (2) inwardly extending annular protrusions 360 and 362. The annular protrusion 360 is located between the recesses 264 and 274, and the annular protrusion 362 is located between the recesses 274 and 284. The annular protrusions 360 and 362 each include a ring-like or rib-like structure between the adjacent annular recesses. Each of the annular protrusions 360 and 362 includes an internal face 364, 366, respectively, and these faces 364 and 366 are approximately parallel with the longitudinal axis A. Accordingly, the faces 364 and 366 of annular protrusions may be parallel with the surfaces 40a-40b of the annular recesses 264, 274 and 284 as discussed above. The faces 364 and 366 define internal radii of the protrusions respectively. Similarly, the radius of each of the protrusions may be equal to the radius of the preceding (e.g., upstream) protrusion. For example, the radius of the first protrusion 360 may be equal to the radius of the second protrusion 362.

Referring again to FIG. 1 and FIG. 2, the notch sets of 164, 174 and 184 are disposed along the longitudinal axis A of the valve trim assembly 19. The plural notch sets 164,174 and 184 are configured to direct fluid flow around the plug 22. For example, the notch set 164 is cut or otherwise suitably formed into or on the outer surface 36 of the plug 22. Further, the notch set 164 includes two notches 164a and 164b, which are disposed on opposite sides of the plug 22 from one another, and are aligned with one another along a plane transverse to the longitudinal axis A. In other words, the notches 164 are cut at approximately the same axial location along the length of the plug 22.

Figure 4:
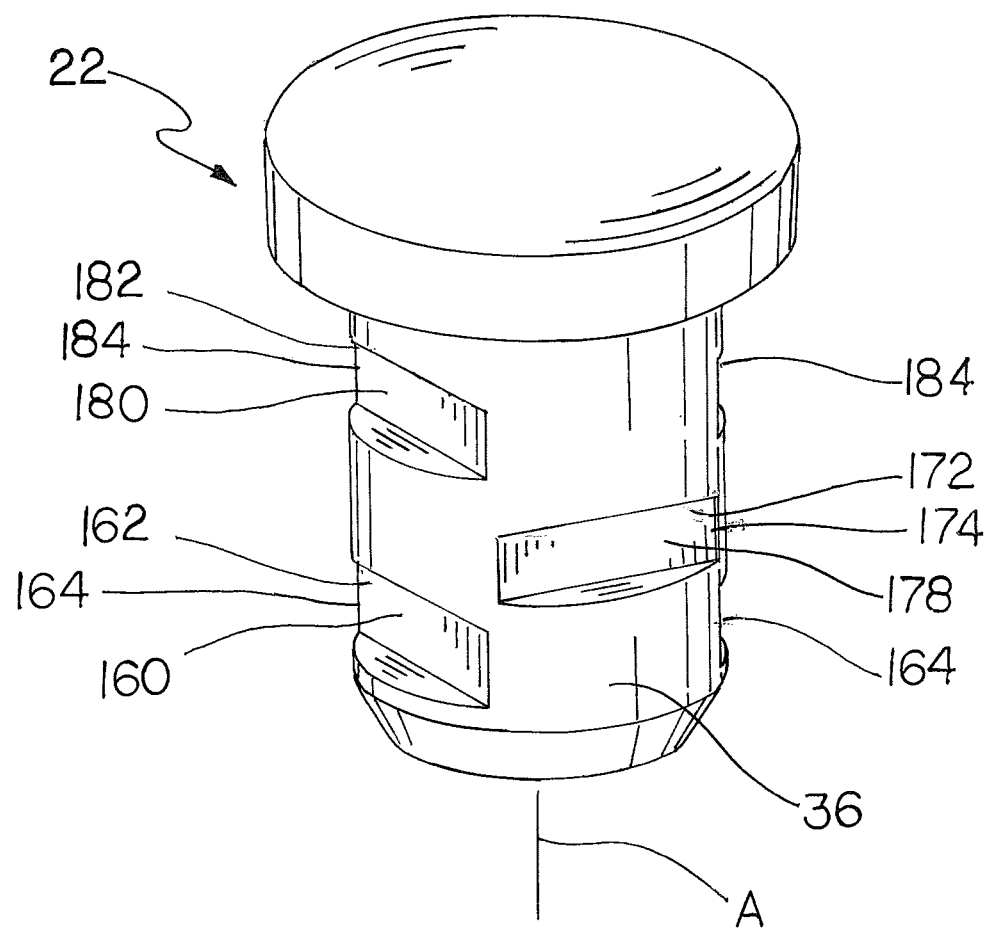
FIG. 4 is a perspective view of an exemplary valve plug assembled in accordance with the teachings of the present disclosure.

As shown in FIGS. 1, 2 and 4, each of the notches 164a and 164b have faces 160 that are parallel to one another and parallel to the longitudinal axis A. Each of the notches 164a and 164b also include an upper face 162. The upper face 162 is angled relative to the face 160, and thus is also angled with respect to the longitudinal axis A. The angle between the upper face 162 and the face 160 is obtuse, and the upper face 162 and the face 160 together define a notch bevel angle 51 (see FIGS. 5A and 5B).

Similarly, the second notch set 174 includes notches 174a and 174b, which are cut or otherwise suitably formed into or on the outer surface 38 of the plug 22. The notches 174a and 174b are on opposite sides of the plug 22 from one another, and are aligned with one another along a plane transverse to the longitudinal axis A. In other words, the notches 174a and 174b are cut at approximately the same axial location along the length of the plug 22, and are disposed higher on the valve plug 22 (i.e., downstream) than are the notches 164a and 164b. The notches 174a and 174b have faces 178 that are parallel to one another and parallel to the longitudinal axis A. However, as can be seen to advantage in FIG. 4, the notches 174a and 174b are not disposed parallel to the notches 164a and 164b, but instead are rotated 90 degrees about the longitudinal axis A such that the faces 178 of the notches 174a and 174b are oriented perpendicular to the faces 160 of the notches 164a and 164b (e.g., planes passing through the first faces 160 and the second faces 178 are parallel to the longitudinal axis A, and are perpendicular to one another). An upper face 172 of each of the notches 174a and 174b is angled relative to the face 178 and to the longitudinal axis A. The angle between the upper face 172 and the face 178 is obtuse. In other words, the upper face 172 and the face 178 together define another notch bevel angle.

Similarly, the third notch set 184 includes notches 184a and 184b, which are again cut or otherwise suitably formed into or on the outer surface 38 of the plug 22. The notches 184a and 184b are on opposite sides of the plug 22 from one another, and are again aligned with one another along a plane transverse to the longitudinal axis A. In other words, the notches 184a and 184b are cut at approximately the same axial location along the length of the plug 16. The notches 184a and 184b are again disposed higher (downstream) on the valve plug 22 than are the notches 174a and 174b. The notches 184a and 184b have faces 180 that are parallel to one another and parallel to the longitudinal axis A. However, as can be seen to advantage in FIG. 4, the notches 184a and 184b are not disposed parallel to the notches 174a and 174b, but instead are rotated 90 degrees about the longitudinal axis A such that the faces 180 of the notches 184a and 184b are oriented parallel to the faces 160 of the notches 164a and 164b. An upper face 182 of each of the notches 184a and 184b is angled relative to the face 180 and to the longitudinal axis A. The angle between the upper face 182 and the face 180 is obtuse. In other words, the upper face 182 and the face 180 together define a notch bevel angle.

Figure 5A:
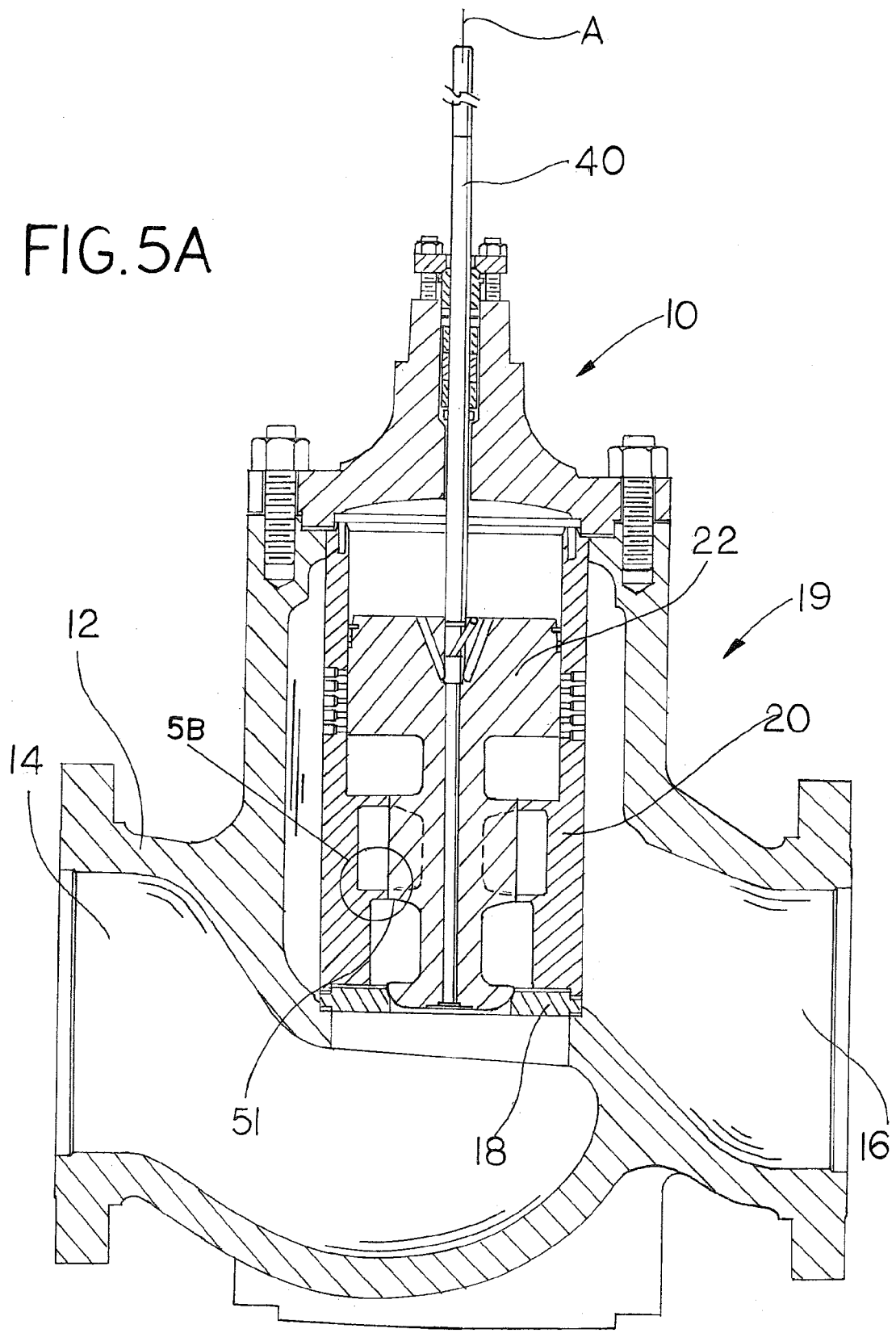
FIG. 5A is a cross-sectional view of the flow control valve of FIG. 1.
Figure 5B:
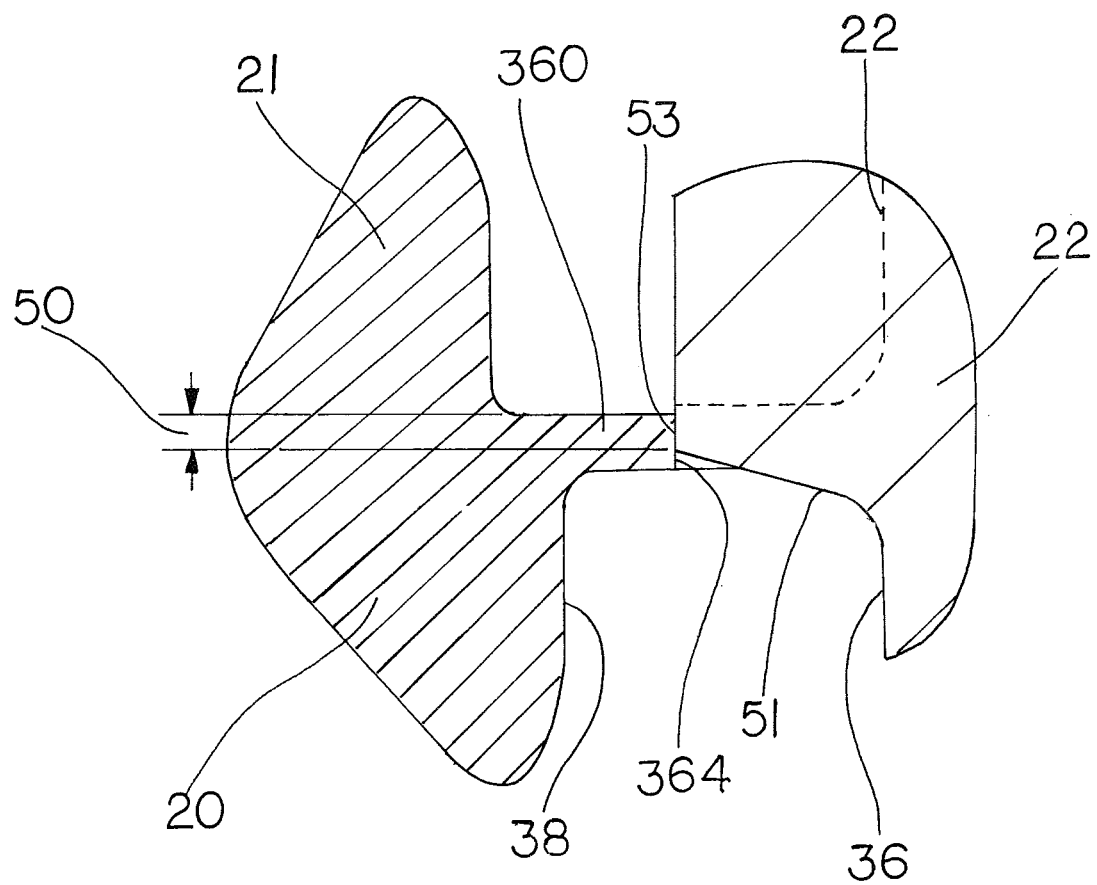
FIG. 5B is an enlarged fragmentary cross-sectional view taken at the circumscribed portion 5B of FIG. 5A and showing dead-band area of the valve plug engaging the surrounding protrusion of the valve cage, and also showing a notch bevel of the valve plug.

FIG. 5B shows the partial enlarged drawing of a dead-band area 50 taken about the circumscribed portion 5B of FIG. 5A. Preferably, each of first two stage annular protrusions of the cage 20 and a contact portion of the plug form a flow control dead-band zone or dead-band area 50 to reduce exposure to a pressure drop at the sealing surface 34 of the valve seat 18 as the plug 22 disengages from the valve seat 18. In accordance with the disclosed example, the anti-out-gassing trim design protects the surface of the valve seat 18 by adding the dead-band area to the first two stages of the valve. The exemplary notch bevel angle 51 is shown in greater detail in FIG. 5B. The other stages may have different notch bevel angles.

For example, for a valve that comprises three or less stages, the plug notch bevel angle 51 is also different between stages. See FIG. 1 as an example. As illustrated, the angle of the second stage bevel is bigger than the first stage bevel, which is to make extra flow area for a larger volume of fluid. As a result, the gas and liquid can go through the stage more easily. For a valve include four or more stages (including four stages), the dead-band area for the third and latter stages may be replaced by a constant opening, which will increase the flow area (See FIG. 3).

The cage also has apertures 70 through the wall of the cage 20 and disposed in the last stage. The apertures 70 may be in the form of small holes, slots, or other suitable forms. The size, quantity, layout of the apertures may differ. The apertures provide effective attenuation of aerodynamic noise in fluid applications involving high pressure drops or high pressure drop ratios. Those of skill in the art may realize that aerodynamic noise is generated by the turbulence created in the flow of fluid as the fluid passes through a control valve. To achieve effective noise attenuation, the cage may therefore utilize multiple apertures or orifices of a suitable shape, size, and spacing. These orifices break up turbulent fluid streams, reducing noise-producing interactions. The size of the apertures in the valve cage can alter the size of the fluid jets. Breaking up the large jets into smaller jets helps to prevent vibration, and also helps to reduce the damage from entrained particulate.

In operation, fluid flows into the valve body 12 via the inlet 14, through the valve trim assembly 19, and exits the flow control valve 10 via the outlet 16. It will be appreciated that the term fluid encompasses fluid media including a liquid and/or gaseous state, such as water and steam, and further encompasses mixed-phase media, such as media having suspended solids. As the fluid passes through the valve trim assembly 19, the fluid is directed through a variety of throttling (e.g., pressure and/or velocity reducing) points that absorb energy from the fluid, thereby reducing the pressure and the velocity of the fluid as it travels through the valve trim assembly 19.

As shown in FIG. 1, the fluid is flowing in the direction of the arrows along the fluid flow path 32, generally from the left toward the right, and generally upward along the valve plug 22. The teachings of the valve trim assembly 19 may also be adapted for use on globe valves and/or angled valves (such as the angled valve 60 of FIG. 6).

In operation, when the valve is slightly open, a relatively high pressure drop may be occur when the fluid flows through the small gap between the plug and the valve seat, which causes the flashing or cavitations phenomena referred to above. Providing a dead-band area between the cage and the plug in one or more pressure drop stages, and downstream of the interface at the sealing surface 34 of the valve seat 18 and the plug 22, serves to reduce or eliminate such phenomena.

By providing dead-band, when the valve is slightly open the fluid can flow through the opening between the plug and valve seat and enter the first stage. However, due to the dead-band area 50 between the first stage and the second stage, the fluid cannot flow into the second stage. Therefore a larger back-pressure will not be created, and consequently there will be only a small fluid pressure drop as the fluid flows into the first stage. Therefore, the phenomena of flashing or cavitation will not happen.

On the other hand, if the valve is opening to a certain extent, the dead-band area has been overcome. That is, the protrusions of the valve plug have completely disengaged the inward annular protrusions of the cage. The gap between the plug and the valve seat is sufficient, and the back-pressure present at the first stage will not create a large pressure drop, thus minimizing or preventing flashing or cavitation when the fluid flows between the plug and the sealing surface of the valve seat. Therefore, the fluid can pass each stage smoothly.

Although the dead-band area may affect the response speed of the valve, it protects the sealing surface of the plug and valve seat, prolongs the lifetime of the valve trim, and is suitable in the out-gassing working conditions.

It should be noted that the above described embodiments are given for describing rather than limiting the utility model, and it is to be understood that modifications and variations may be resorted to without departing from the spirit and scope of the utility model as those skilled in the art readily understand. Such modifications and variations are considered to be within the scope of the utility model and the appended claims. The protection scope of the utility model is defined by the accompanying claims. In addition, any of the reference numerals in the claims should not be interpreted as a limitation to the claims. Use of the verb "comprise" and its conjugations does not exclude the presence of elements or steps other than those stated in a claim. The indefinite article "a" or "an" preceding an element or step does not exclude the presence of a plurality of such elements or steps.

What is claimed:

1. A flow control valve, comprising:
a valve body having an inlet, an outlet, and defining a fluid flow path extending between the inlet and the outlet;
a valve seat disposed within the valve body;
a valve plug disposed in the valve body, the valve plug defining a longitudinal axis and arranged to shift along the longitudinal axis between a fully open position and a closed position;
a bonnet assembly coupled to the valve body, the bonnet assembly removed from the fluid flow path;
an exterior surface of the valve plug having a plurality of notch sets, each notch set spaced apart from an adjacent notch set along the longitudinal axis, the plurality of notch sets comprising at least a first notch set, a second notch set, and a third notch set, the second notch set being rotated about the longitudinal axis of the plug relative to the first notch set, each of the first, second, and third notch sets including first and second notches disposed parallel to one another; and
a cage disposed within the valve body, the cage surrounding the valve plug and having a first end seated against the valve seat to retain the valve seat in the valve body and a second end, opposite the first end, seated against the bonnet assembly, an interior of the cage including a plurality of annular recesses, the annular recesses spaced apart along the longitudinal axis and including a first annular recess defining a first volume, a second annular recess downstream of the first annular recess and defining a second volume that is greater than the first volume, and a third annular recess downstream of the second annular recess and defining a third volume that is greater than the second volume, the cage including a plurality of apertures forming a portion of the fluid flow path, and the cage including a first inwardly extending annular protrusion located between the first annular recess and the second annular recess, and a second inwardly extending annular protrusion located between the second annular recess and the third annular recess, the second inwardly extending annular protrusion having a radius substantially equal to a radius of the first inwardly extending annular protrusion;
wherein a radius of an outer surface of the third annular recess is larger than a radius of an outer surface of the second annular recess, and the radius of the outer surface of the second annular recess is larger than a radius of an outer surface of the first annular recess;
wherein the exterior surface of the valve plug includes a first protrusion between the first and second notch sets, and a second protrusion between the second and third notch sets;
wherein when the valve plug is in the closed position, the first protrusion of the exterior surface of the valve plug engages the first inwardly extending annular protrusion, and the second protrusion of the exterior surface of the valve plug engages the second inwardly extending annular protrusion;
wherein when the valve plug is in the fully open position, the first protrusion of the exterior surface of the valve plug is disengaged from the first inwardly extending annular protrusion, and the second protrusion of the exterior surface of the valve plug is disengaged from the second inwardly extending annular protrusion; and
wherein the notch sets and the recesses are arranged to form a plurality of turns in the fluid flow path when the valve plug is shifted toward the open position.

2. The flow control valve of claim 1, wherein the first annular recess is disposed adjacent the valve seat and the second annular recess is spaced away from the valve seat.

3. The flow control valve of claim 1, wherein the first notch set defines a first bevel angle and the second notch set defines a second bevel angle, the second bevel angle being greater than the first bevel angle.

4. The flow control valve of claim 3, wherein the first notch set defines a first bevel angle between an upper face of each of the first notches and the longitudinal axis, the second notch set defines a second bevel angle between an upper face of each of the second notches and the longitudinal axis, the second bevel angles being greater than the first bevel angles.

5. The flow control valve of claim 1, wherein the first and second protrusions are sized and arranged to engage the first and second inwardly extending annular protrusions, respectively, of the cage over a portion of an overall stroke length of the valve plug to provide a fluid flow dead band.

6. The flow control valve of claim 1, wherein in the flowing direction of the fluid flow path, each of the annular recesses defines an expanding space that is larger than the preceding annular recesses.

7. The flow control valve of claim 1, wherein each notch of the second set of the notches has a bevel angle larger than that of each notch of the first set of the notches.

8. The flow control valve of claim 7, wherein the bevel angle of each notch of the first set of notches and each notch of the second set of notches is obtuse.

9. The flow control valve of claim 1, wherein the first and second notches of each of the first and second notch sets have faces parallel to one another and parallel to the longitudinal axis.

10. The flow control valve of claim 1,
   wherein the exterior surface of the valve plug further includes a third protrusion adjacent the third notch set and downstream of the first and second protrusions; and
   wherein, when the valve plug is in the closed position, the third protrusion is arranged to engage an inner surface of the cage.

11. The flow control valve of claim 10, wherein, when the valve plug is in the closed position, each of the first and second inwardly extending protrusions and the first and second protrusions of the valve plug form a dead band area.

12. The flow control valve of claim 10, wherein when the valve plug is in the closed position, the first notch set is substantially aligned with the first annular recess, the second notch is substantially aligned with the second annular recess, and the third notch is substantially aligned with the third annular recess.

13. The flow control valve of claim 10, wherein when the valve plug is in the closed position, the third protrusion of the exterior surface of the valve plug sealingly engages the apertures of the cage.

14. The flow control valve of claim 1, wherein when the valve plug is in the closed position, the first notch set is substantially aligned with the first annular recess, the second notch is substantially aligned with the second annular recess, and the third notch is substantially aligned with the third annular recess.

15. The flow control valve of claim 1, wherein when the valve plug is in the closed position, an entirety of the exterior surface of the valve plug engages the inner surface of the cage.

16. The flow control valve of claim 1, wherein each of the plurality of apertures is formed through the cage along an axis that is perpendicular to the longitudinal axis.

17. The flow control valve of claim 1, further comprising:
   a valve stem coupled to the valve plug,
   the valve stem extending through the bonnet assembly.

18. The flow control valve of claim 17, wherein the valve stem has a lower end secured to the valve plug and an upper end, opposite the lower end, disposed outside of the bonnet assembly and the valve body.

19. The flow control valve of claim 1, wherein the inlet and the outlet are oriented along an axis that is perpendicular to the longitudinal axis.

20. A flow control valve, comprising:
   a valve body having an inlet, an outlet, and defining a fluid flow path extending between the inlet and the outlet;
   a valve seat disposed within the valve body;
   a valve plug disposed in the valve body, the valve plug defining a longitudinal axis and arranged to shift along the longitudinal axis between a fully open position and a closed position;
   a bonnet assembly coupled to the valve body;
   a valve stem extending through the bonnet assembly, the valve stem having a lower end secured to the valve plug and an upper end, opposite the lower end, disposed outside of the bonnet assembly and the valve body;
   an exterior surface of the valve plug having a plurality of notch sets, each notch set spaced apart from an adjacent notch set along the longitudinal axis, the plurality of notch sets comprising at least a first notch set, a second notch set, and a third notch set, the second notch set being rotated about the longitudinal axis of the plug relative to the first notch set, each of the first, second, and third notch sets including first and second notches disposed parallel to one another; and
   a cage disposed within the valve body, the cage surrounding the valve plug and having a first end seated against the valve seat to retain the valve seat in the valve body and a second end, opposite the first end, seated against the bonnet assembly, an interior of the cage including a plurality of annular recesses, the annular recesses spaced apart along the longitudinal axis and including a first annular recess defining a first volume, a second annular recess downstream of the first annular recess and defining a second volume that is greater than the first volume, and a third annular recess downstream of the second annular recess and defining a third volume that is greater than the second volume, the cage including a plurality of apertures forming a portion of the fluid flow path, and the cage including a first inwardly extending annular protrusion located between the first annular recess and the second annular recess, and a second inwardly extending annular protrusion located between the second annular recess and the third annular recess, the second inwardly extending annular protrusion having a radius substantially equal to a radius of the first inwardly extending annular protrusion;
   wherein a radius of an outer surface of the third annular recess is larger than a radius of an outer surface of the second annular recess, and the radius of the outer surface of the second annular recess is larger than a radius of an outer surface of the first annular recess;
   wherein the exterior surface of the valve plug includes a first protrusion between the first and second notch sets, and a second protrusion between the second and third notch sets;
   wherein when the valve plug is in the closed position, the first protrusion of the exterior surface of the valve plug engages the first inwardly extending annular protrusion, and the second protrusion of the exterior surface of the valve plug engages the second inwardly extending annular protrusion;
   wherein when the valve plug is in the fully open position, the first protrusion of the exterior surface of the valve plug is disengaged from the first inwardly extending annular protrusion, and the second protrusion of the exterior surface of the valve plug is disengaged from the second inwardly extending annular protrusion; and wherein the notch sets and the recesses are arranged to form a plurality of turns in the fluid flow path when the valve plug is shifted toward the open position.

* * * * *

UNITED STATES PATENT AND TRADEMARK OFFICE
CERTIFICATE OF CORRECTION

PATENT NO. : 9,851,013 B2
APPLICATION NO. : 13/731419
DATED : December 26, 2017
INVENTOR(S) : Qiyong Zhou et al.

It is certified that error appears in the above-identified patent and that said Letters Patent is hereby corrected as shown below:

In the Specification

At Column 1, Line 27, "abrubtly," should be -- abruptly, --.

At Column 5, Line 44, "outer surface 38" should be -- outer surface 36 --.

At Column 6, Line 1, "outer surface 38" should be -- outer surface 36 --.

At Column 6, Line 6, "plug 16." should be -- plug 22. --.

Signed and Sealed this
Twenty-sixth Day of June, 2018

Andrei Iancu
*Director of the United States Patent and Trademark Office*